United States Patent [19]

Bartsch

[11] 3,836,327

[45] Sept. 17, 1974

[54] AROMATIC ALCOHOL-AROMATIC ALDEHYDE CARRIER DYEING OF AROMATIC POLYAMIDES

[75] Inventor: Friedrich F. Bartsch, Westfield, N.J.

[73] Assignee: Sybron Corporation, Rochester, N.Y.

[22] Filed: July 20, 1972

[21] Appl. No.: 273,516

Related U.S. Application Data

[63] Continuation-in-part of Ser. No. 105,093, Jan. 8, 1971, abandoned.

[52] U.S. Cl. ........................................ 8/173, 8/172
[51] Int. Cl. .............................................. D06p 1/86
[58] Field of Search ................................. 8/93, 173

[56] References Cited
UNITED STATES PATENTS
3,506,990   4/1970   Richardson ............................ 8/172
FOREIGN PATENTS OR APPLICATIONS
856,381   12/1960   Great Britain ........................... 8/54

OTHER PUBLICATIONS

R. W. Schummes et al. Text, Chem. & Color, Aug. 17, 1969, pg. 27–30.

Kirk Othemer, Encyclopedia of Chemical Technology, 2nd Edition, Vol. 3, pg. 360–361.

Primary Examiner—Donald Levy
Attorney, Agent, or Firm—Theodore B. Roessel

[57] ABSTRACT

Yarns and other shaped articles made of aromatic polyamides of the non-flammable type are dyed by a process which includes treating the material with a cationic dye composition using as a carrier a blend of an aromatic aldehyde and an aromatic alcohol in which the aromatic alcohol is present in a ratio of greater than 1 part of the aromatic alcohol per each part of the aromatic aldehyde. A typical dye carrier blend consists of 10 grams per liter of dye bath of p-tolylaldehyde and 30 grams per liter of dye bath of benzyl alcohol.

9 Claims, No Drawings

AROMATIC ALCOHOL-AROMATIC ALDEHYDE CARRIER DYEING OF AROMATIC POLYAMIDES

CROSS-REFERENCE TO RELATED APPLICATIONS

This application is a continuation-in-part of application Ser. No. 105,093 filed Jan. 8, 1971, now abandoned.

BACKGROUND OF THE INVENTION

This invention relates to an improved process for dyeing non-flammable polyamide yarns and other shaped articles prepared from aromatic diamines and aromatic dicarboxylic acids, and more particularly relates to a process for dyeing non-flammable polyamides prepared from aromatic diamines and aromatic dicarboxylic acids with cationic dyes in the presence of an improved dye carrier blend composition.

Nylon is the generic term for any long-chain polymeric amide which has recurring amide groups, —CONH— as an integral part of the main polymer chain. The aliphatic polyamides prepared from aliphatic diamines and aliphatic dicarboxylic acids are generally used in the manufacture of textile products which are readily dyeable to a multitude of colors and shades.

In view of recent safety standards which require non-flammable materials for many consumer and commercial products, the nylon normally prepared from the aliphatic diamines and aliphatic dicarboxylic acids have failed to meet the required specifications due to the flammable characteristics of textile materials manufactured therefrom. Thus, a series of non-flammable aromatic polyamides prepared from the aromatic diamines and dicarboxylic acids or derivatives of dicarboxylic acids, such as, the acids halides have been developed to replace the aliphatic polyamides where safety standards require non-flammable and heat resistant characteristics. However, because of the high degree of crystallinity, these aromatic polyamide or nylon fibers are very difficult to dye by normal dyeing procedures generally applicable to the dyeing of the aliphatic polyamide or nylon fibers. This difficulty has severely limited the application of yarns and other shaped articles where styling dictates that the products be readily available in a wide variety of colors and shades such as in garments and carpets.

Synthetic fibers are normally dyed with the aid of dye carriers or assistants. These dye carriers are generally organic substances which swell the fibers and allow the dye molecules to diffuse into the fiber. Most of the compounds which have normally been used as dye carriers for synthetic fibers, have shown very little effect in dyeing of the non-flammable aromatic polyamide or nylon fibers. These compounds which have little effect in the dyeing of non-flammable aromatic polyamides, include such compounds as aromatic hydrocarbons such as methylnaphthalene, phenols such as o-phenylphenol and p-phenylphenol, chlorinated compounds such as trichlorobenzene, esters such as butyl benzoate and methyl cresotinate, aromatic alcohols such as benzyl alcohol and other dye assistants as shown in U.S. Pat. No. 2,394,688. Benzyl alcohol is the carrier material generally preferred for the dyeing of the common aliphatic polyamide or nylon fibers as disclosed in U.S. Pat. No. 3,467,484. Benzyl alcohol and benzaldehyde are also disclosed as organic compounds found useful in the dyeing of the aliphatic polyamides in British Pat. No. 856,381. Dyeing by use of dye assistants such as o-phenylphenol and p-phenylphenol is disclosed in U.S. Pat. No. 2,926,987.

One method for the dyeing of the aromatic polyamide materials with cationic dyes has been described by Evans and Schumm in *Textile Chemist and Colorists*, Vol. 2, No. 15, pages 25 - 28, (1970). The Evans and Schumm method utilizes benzaldehyde as a dye carrier in concentration of 40 grams per liter of dyeing solution and allows the dyeing of the fiber in the form of stock, yarn or fabric in a number of colors and shades without impairing the aesthetic properties or flammability of the fiber. However, the use of benzaldehyde as a dye carrier severely limits the usefulness of the dyeing process because it is costly in the concentrations required to successfully dye the aromatic polyamide or nylon fibers and because it has a very heavy and penetrating odor which makes it extremely unpleasant to use in the dye house and which persists in the dyed fiber even when small amounts of the carrier material remain on the dyed yarn or other shaped articles.

In another method of dyeing aromatic polyamides with basic dyestuffs Richardson et al. in U.S. Pat. No. 3,506,990 disclose a class of dye assistants which include salicyl aldehyde, salicylic acid, benzyl alcohol, benzoic acid, o-phenylphenol and the like. However, Richardson et al. disclose that the dye assistant must be used on a polymer carrying dye associable units and must be heated under super-atmospheric pressures. The Richardson et al. process utilizes ingredients generally characterized by noxious odors and high toxicity. The Richardson et al. process is also expensive. Schumm et al. on pages 27–30 of *Textile Chemist and Colorists*, Vol. 1, No. 10 (1969) also disclose that benzyl alcohol and salicylaldehyde have been tried as carriers in the dyeing of aromatic polyamide fabrics, but again toxicity, expense, noxious odors and also ineffectiveness of the benzyl alcohol as a carrier are characteristics of these dye assistants.

OBJECTS OF THE INVENTION

Accordingly, it is an object of this invention to provide an improved process for dyeing non-flammable aromatic polyamide shaped articles.

It is another object of this invention to provide an improved low odor process for the dyeing of non-flammable, aromatic polyamide shaped articles.

It is still another object of this invention to provide an economical process for dyeing non-flammable, aromatic polyamide shaped articles without impairing the aesthetic properties or flammability of the articles.

Still another object of this invention is to provide an economical dye carrier composition having reduced toxicity and little or no odor for the dyeing of non-flammable, aromatic polyamide shaped articles.

These and other objects and advantages of the invention will become apparent to those skilled in the art.

SUMMARY OF THE INVENTION

I have found surprisingly that a wide variety of deep and fast shades of color are obtained in the dyeing of non-flammable, aromatic polyamide yarns and other shaped articles when cationic dyes are used with a dye carrier mixture of a low concentration of an aromatic aldehyde and a higher concentration of an aromatic alcohol. In the improved process for dyeing non-flammable, aromatic polyamide yarns and other shaped articles of this invention, the dye carrier compositions consist of mixtures of aromatic alcohols and aromatic aldehydes wherein the ratio of alcohol to aldehyde is greater than 1:1. These dye carrier mixtures are effective in dyeing non-flammable, aromatic polyamide or nylon fibers with cationic dyes under normal dyeing conditions. For optimum color yield, it is critical that the ratio of the mixture of aromatic alcohol to aromatic aldehyde be greater than 1 part of the alcohol to 1 part of the aldehyde and that the mixture be present at a concentration of at least 25 grams per liter of dye bath solution.

DESCRIPTION OF THE PREFERRED EMBODIMENTS

The process for dyeing the polyamide yarns and other shaped articles prepared from aromatic diamines and aromatic dicarboxylic acids or derivatives of dicarboxylic acids with cationic dyes may be carried out by preparing a dye bath consisting essentially of 1 or more cationic dyes dissolved in water. Other adjuvants such as sodium nitrate, acetic acid and the like may be added to the dye bath solution. The preferred mixture consists of about 1.5 parts of the aromatic alcohol per 1.0 part of the aromatic aldehyde up to about 5.0 parts of the aromatic alcohol per 1.0 part of the aromatic alcohol. However, it is within the scope of the invention to use an aromatic alcohol to aromatic aldehyde ratio greater than 1:1. The dye carrier mixture is prepared and added to the dye bath solution in a quantity of at least 25 grams of the blend per liter of dye bath solution; or the proper proportions of the aromatic alcohol and the aromatic aldehyde may be added separately to the dye bath solution.

After the preparation of the dye bath, standard dyeing conditions used in the dyeing of non-flammable, polyamide fibers with cationic dyes are then followed. Under standard conditions the polyamide textile material is placed in the dye bath solution; the dye bath solution is then heated to temperatures of about 210° – 270°F.; the bath is maintained at about 210° – 270°F. for about 2 hours followed by cooling; the dyed polyamide textile is removed from the dye bath solution and rinsed with water at a temperature of about 50° – 210°F. and then dried in a circulating air oven at about 100° – 400°F. The pH of the dye bath solution is adjusted to about 2.0 to 5.0 with acetic or formic acid. The water-to-goods ratio is generally 5:1 to 30:1.

The aromatic aldehyes useful in the practice of this invention are those aromatic aldehyes which have a boiling point below about 325°C. and include benzaldehyde, o-tolylaldehyde, m-tolylaldehyde, p-tolylaldehyde and derivatives thereof wherein the aromatic ring is substituted by one or more alkyl, chloro, or alkoxy groups.

The aromatic alcohols suitable for use in the dye carrier mixture prepared in accordance with this invention are benzyl alcohol, o-tolyl alcohol, m-tolyl alcohol, p-tolyl alcohol, 2-hydroxyethyl phenyl ether and derivatives thereof wherein the aromatic ring is substituted with one or more alkyl, chloro, or alkoxy groups.

Since both the aromatic aldehyes and the aromatic alcohols which are used in the preparation of the dye carrier of this invention are relatively insoluble in water, a more uniform dyeing may be obtained by incorporating an emulsifying agent in the dye bath. Nonionic emulsifying agents are preferred in the practice of this invention since they exhibit the best compatibility with the cationic dyes. Suitable non-ionic emulsifying agents may be chosen by those skilled in the art, however, sucy non-ionic emulsifying agents as polyethoxylated alkyl phenols, polyethoxylated aliphatic alcohols and polyethoxy fatty esters have been found useful in the practice of this invention. Anionic emulsifying agents may also be used in the dye bath solution, however, anionic emulsifying agents may be used only in conjunction with a sufficient amount of nonionic emulsifying agent to prevent precipitation of cationic dye. The amount of non-ionic emulsifying agent sufficient to prevent such precipitation in the presence of anionic emulsifying agents may be adjusted by one skilled in the art. Since emulsifying agents induce the solubilization of dye from the fiber, yarn or other shaped article, the amount of emulsifying agent used in the dye bath solution should be as low as possible. The preferred amount of emulsifying agent may be present in a range of about 1 to 10 parts per 100 parts of the aromatic adlehyde-aromatic alcohol dye bath carrier mixture, or approximately 0.5 to 3.0 grams per liter of dye bath solution.

Minor amounts of other ingredients may be added to the dye bath solution for specific purposes without effecting the essential novelty of the present invention. Retarding agents and migrating agents may be added to improve the levelness of the dyeing. Buffering agents may be used to control the pH of the solution. Inorganic salts may be added to increase exhaustion of dye from the dye bath, for example, the addition of sodium nitrate. Odor masking agents may be added to further reduce the odor of the dye bath during processing.

Minor amounts of solid organic compounds which swell the fibers may be added to the dye bath solution. These swelling agents are designated as auxiliary dye carriers. Such organic compounds as benzoic acid, p-phenylphenol and benzene sulfonamide have been found to be particularly effective as auxiliary dye carriers. The use of auxiliary dye carriers in conjunction with the aromatic alcohol of the dye carrier mixture aids in the reduction of the amount of odor producing aromatic aldehyde needed in the mixture to achieve an acceptable degree of dye coloration. The amount of auxiliary dye carrier may vary from about 0 to 10 grams per liter of dye bath solution, and it is preferred that about 2 to 10 grams per liter of dyebath solution or 5 to 40 percent (based on the weight of the dye carrier composition) be used.

It should be understood that any cationic dyes can be utilized with my invention, and it is not to be considered as limited to the cationic dyes disclosed in the following examples. The cationic dyes which may be used in this invention are those which are soluble in the dye bath solution at a pH less than 7.0. The aromatic polyamide materials which may be dyed in accordance with the process of this invention may be in the form of fibers, yarns, cloth, tow, film or any other shaped article. Accordingly, by use of the term "shaped article," I intend to include fibers, yarns, cloth, tow, film and the like.

The aromatic polyamides which may be dyed in accordance with the present invention, are those prepared from aromatic diamines and aromatic dicarboxylic acids. Examples of these are disclosed on pages 664 and 665 of *Chem Tech.*, November 1971, where poly(1,3-phenylene isophthalamide) is disclosed as a polycondensation product of m-phenylenediamine and isophthaloyl chloride. As used herein, aromatic dicarboxylic acid also refers to derivatives of aromatic dicarboxylic acids, such as, the acid halides. Isophthaloyl chloride is an example of a derivative of an aromatic dicarboxylic acid.

The dye bath should be in a pH range of about 2 to about 7, but preferably the pH of the bath is approximately 2.0 to 5.0. The pH can be adjusted by the addition of a sufficient amount of organic acid such as formic or acetic acids or mineral acid such as hydrochloric or sulfuric acid and the like for lowering the pH, or by the addition of a sufficient amount of a base such as tetrasodium pyrophosphate for raising the pH. By a sufficient amount of either the acid or the base, I mean that amount which must be added to the dye bath solution to adjust the pH of the bath to about 2 to 7. It is deemed within the purview of one skilled in the art to adjust the pH of the bath.

The dye carrier may be applied to the aromatic polyamide shaped article by adding the dye carrier to the dye bath or by preliminarily applying the dye carrier directly to the shaped article followed by treatment in the dye bath solution.

In order to disclose more clearly the nature of the present invention, specific examples illustrating the preparation of the dye carrier and the process of dyeing the aromatic polyamide shaped articles will hereafter be described.

EXAMPLES 1 – 9

Equal quantities of water and the cationic dye, Basic Red 29 were placed in a series of dyeing beakers. An amount of the Basic Red 29 dye equivalent to 3% of the weight of the material to be dyed was used. Twenty-five grams per liter of dye bath solution of sodium nitrate was added to each bath. Acetic acid equivalent to 2 percent of the weight of the material to be dyed was also added to each of the stainless steel dyeing beakers. Various dye bath carrier compositions which are set out in greater detail in Table I below, were introduced into each dye bath at concentrations shown in Table I. Non-flammable aromatic polyamide fabric was woven from yarns of Nomex (TM) T-450, poly (1, 3-phenylene isophthalamide), a polycondensation product of m-phenylenediamine and isophthaloyl chloride, and scoured. The scoured fabric was added to each dye bath in an amount to give a dye bath to farbic ratio of 10 to 1. The stainless steel dyeing beakers were then sealed, placed in a Pressure Launderometer dyeing machine and heated gradually to 250°F. The dyeing process was carried out for 2 hours at 250°F. The beakers were then cooled to 120°F., opened and the dyed fabrics were removed and rinsed thoroughly with water at 80°F. The fabrics were then dried in a circulating air oven at 250°F. and their color depths were rated visually. The percent relative of color yield for each fabric is given in Table I below.

TABLE I

DYEING FABRIC WOVEN FROM POLY (1,3-PHENYLENE ISOPHTHALAMIDE) WITH BASIC RED 29

| Example | Dye Carrier | Concentration of Dye Carrier (g/l dye bath) | % Relative of Color Yield |
|---------|-------------|---------------------------------------------|---------------------------|
| 1 | Benzaldehyde | 40 | 100 |
| 2 | Benzaldehyde | 10 | 10 |
| 3 | Benzyl Alcohol | 30 | 15 |
| 4 | Benzyl Alcohol | 40 | 30 |
| 5 | p-tolylaldehyde | 40 | 100 |
| 6 | p-tolylaldehyde | 10 | 30 |
| 7 | Benzaldehyde<br>Benzyl Alcohol | 10<br>30 | 95 |
| 8 | p-tolylaldehyde<br>Benzyl Alcohol | 10<br>30 | 95 |
| 9 | p-tolylaldehyde<br>Benzyl Alcohol<br>Non-ionic Emulsifier | 10<br>30<br>1.5 | 100 |

The data reported in Table 1 above, show the unexpected synergistic effect of using the mixture of aromatic alcohol and aromatic aldehyde where the aromatic aldehyde concentration is minor compared to that of the aromatic alcohol, on the color yield of the dyed non-flammable aromatic polyamide cloth. Although a high concentration of benzaldehyde, 40 grams per liter produces a color yield of 100 percent, a low concentration of benzaldehyde, 10 grams per liter, produces a color yield of only 10 percent. High concentrations of benzyl alcohol, as shown in Examples 3 and 4 produce low color yields when used alone. Examples 5 and 6 for p-tolylaldehyde are similar to the benzaldehyde shown in Examples 1 and 2. However, when the aromatic aldehyde at only 10 grams per liter and the aromatic alcohol at 30 grams per liter are used as a mixture in the dyeing of the fabric woven from poly (1, 3-phenylene isophthalamide) a color yield of 95 percent is obtained with the dye carrier compositions of Examples 7 and 8. When the aromatic aldehyde used in a low concentration and the aromatic alcohol used at a higher concentration are combined with a non-ionic emulsifier, the color yield obtained on the dying of the woven fabric is 100 percent or equivalent to that when benzaldehyde or p-tolylaldehyde is used at a concentration at 40 grams per liter in Examples 1 and 5. It is to be understood that the higher percentage of color yield, the more effective the dye carrier in dyeing the aromatic polyamide shaped articles.

EXAMPLE 10

The procedure set forth for Examples 1 – 9 was followed using a dye carrier mixture of 10 grams per liter, p-tolylaldehyde and 30 grams per liter, 2-hydroxyethyl phenyl ether. The color yield obtained was 85 percent relative to the yields reported in Table I above.

EXAMPLES 11 – 15

The procedure of Example 1 was followed using a dye mixture containing 1.5 percent Basic Yellow 21, 1.5 percent Basic Red 29 and 1.5 percent Basic Blue 54, all dye concentrations being given as percent of weight of fabric. The compositions and concentrations thereof and the percent of color yield relative to those reported in Table I above, are given in Table II below.

TABLE II

DYEING FABRIC WOVEN FROM POLY (1, 3-PHENYLENE ISOPHTHALAMIDE) WITH YELLOW/RED/BLUE DYE MIXTURE

| Example | Dye Carrier | Concentration of Dye Carrier (g/l dye bath) | % Relative of Color Yield |
|---|---|---|---|
| 11 | p-tolyl alcohol | 15 | |
| | benzyl alcohol | 10 | |
| | p-tolylaldehyde | 5 | 95 |
| 12 | p-tolylaldehyde | 10 | |
| | benzyl alcohol | 30 | 100 |
| 13 | benzyl alcohol | 40 | |
| | p-tolylaldehyde | 5 | 95 |
| 14 | benzyl alcohol | 50 | |
| | benzoic acid | 5 | 45 |
| 15 | benzyl alcohol | 50 | |
| | p-tolylaldehyde | 2.5 | |
| | benzoic acid | 5 | 93 |
| 16 | benzyl alcohol | 30 | |
| | p-tolylaldehyde | 5 | |
| | p-phenylphenol | 4 | 100 |

The synergistic effect of the small amount of aromatic aldehyde on the dye carrier effectiveness of aromatic alcohols can be seen by an examination of the data set forth in the foregoing Table. Examples 14, 15 and 16 illustrate the effect of auxiliary dye carriers such as benzoic acid and p-phenyl phenol.

EXAMPLES 17 – 26

Poly (1, 3-phenylene isophthalamide) was dyed in accordance with the procedure including the same concentrations, quantities and temperatures, set forth in Examples 1–9 above, except Basic Blue 3, CI No. 51005, dye was substituted for the Basic Red 29. The percent relative of color yield obtained by using various dye carriers is set forth in Table III below.

TABLE III

DYEING BABRIC WOVEN FROM POLY (1, 3-PHENYLENE ISOPHTHALAMIDE) WITH BASIC BLUE 3

| Example | Dye Carrier | Concentration of Dye Carrier (g/l dyebath) | % Relative of Color Yield |
|---|---|---|---|
| 17 | Benzaldehyde | 40 | 80 |
| 18 | Benzaldehyde | 10 | 30 |
| 19 | Benzyl Alcohol | 30 | 30 |
| 20 | Benzyl Alcohol | 40 | 40 |
| 21 | p-tolylaldehyde | 40 | 80 |
| 22 | p-tolylaldehyde | 10 | 35 |
| 23 | benzaldehyde | 10 | |
| | benzyl alcohol | 30 | 80 |
| 24 | p-tolylaldehyde | 10 | |
| | benzyl alcohol | 30 | 95 |
| 25 | benzyl alcohol | 30 | |
| | p-tolylaldehyde | 4 | |
| | p-phenylphenol | 5 | 100 |
| 26 | p-tolylaldehyde | 10 | |
| | 2-hydroxylethyl phenyl ether | 30 | 95 |

The data reported in Table III show the unexpected synergistic effect of using the mixture of aromatic alcohol and aromatic aldehyde where the aromatic aldehyde concentration is minor compared to that of the aromatic alcohol, on the color yield of the dyed nonflammable aromatic polyamide when Basic Blue 3, CI No. 51005, cationic dye is used. The heavy and penetrating odor of the aromatic aldehyde was substantially reduced in those examples where the aromatic aldehyde was used with the aromatic alcohol. Conclusions similar to those drawn from the data in Tables I and II can be drawn from the data in Table III. The synergistic effect of a small amount of aromatic aldehyde on the dye carrier effectiveness of aromatic alcohols is demonstrated.

EXAMPLES 27 – 30

Poly (1, 3-phenylene isophthalamide) was dyed according to the procedure set forth for example 1 – 9 above, except Basic Violet 16, CI No. 48013, and Basic Blue 1, CI No. 42025, both cationic dyes, were substituted in separate dyeings for Basic Red 29. The percent relative color yield obtained by using various dye carriers is set forth in Table IV below. Values obtained using each dye are shown in separate columns.

TABLE IV

DYEING FABRIC WOVEN FROM AN AROMATIC POLYAMIDE

| Example | Dye Carrier | Concentration of Dye Carrier (g/l dyebath) | % Relative of Color Yield | |
|---|---|---|---|---|
| | | | Basic Violet 16 | Basic Blue 1 |
| 27 | p-tolylaldehyde | 40 | 50 | 80 |
| 28 | benzyl alcohol | 30 | 30 | 15 |
| 29 | p-tolyaldehyde | 10 | 20 | 20 |
| 30 | p-tolyaldehyde | 10 | 100 | 100 |
| | benzyl alcohol | 30 | | |

The synergistic effect is clearly shown by analyzing the data of Table IV. The use of a small amount of aromatic aldehyde with aromatic alcohol which is not too effective when used alone produces a color yield which far surpasses the use of a high concentration of the aromatic aldehyde which is moderately effective when used alone.

The above Examples are not meant to limit the scope of the invention or the applications to which this invention may be directed. It is to be understood that although the invention has been described with specific reference to particular embodiments therof, it is not to be so limited, since changes and alterations therein may be made which are in the full intended scope of this invention as defined by the appended claims.

I claim:

1. A process for dyeing an aromatic polyamide shaped article prepared from aromatic diamines and aromatic dicarboxylic acids comprising treating said aromatic polyamide shaped article with at least one cationic dye in the presence of a dye carrier composition consisting essentially of an aromatic alcohol selected from the group consising a benzyl alcohol, O-tolyl alcohol, m-tolyl alcohol, p-tolyl alcohol, and 2-hydroxylethyl phenyl ether and an aromatic aldehyde selected from the group consisting of benzaldehyde, o-tolylaldehyde, m-tolylaldehyde and p-tolylaldehyde wherein the ratio of the aromatic alcohol to the aromatic aldehyde is greater than about 3.0 and a concentration of the aldehyde being not greater than about 10 grams per of liter of dye bath.

2. The method of claim 1 wherein said dye carrier composition comprises at least 25 grams per liter of said dye bath solution.

3. The method of claim 1 further comprising adding about 0.5 to 3.0 grams per liter of dye bath solution of a non-ionic emulsifying agent to the dye carrier composition.

4. The method of claim 1 further comprising adding about 0.5 to 3.0 grams per liter of dye bath solution of an anionic-non-ionic emulsifying agent mixture to the dye carrier composition.

5. The method of claim 1 further comprising adding about 0 to 10 grams per liter of dye bath solution of an auxiliary selected from the group consisting of benzoic acid, p-phenylphenol and benzene sulfonamide to the dye carrier composition.

6. The method of claim 1 wherein said dye carrier composition comprises 30 grams per liter of dye bath solution of said aromatic alcohol and 10 grams per liter of dye bath solution of said aromatic aldehyde.

7. The method of claim 1 wherein the pH of the dye bath solution is adjusted to a pH of about 2 to 5.

8. A process for dyeing an aromatic polyamide shaped article prepared from an aromatic diamine and an aromatic dicarboxylic acid with a cationic dye comprising:

a. treating said aromatic polyamide shaped article with a dye carrier composition consisting essentially of an aromatic alcohol selected from the group consisting of benzyl alcohol, o-tolyl alcohol, m-tolyl alcohol and p-tolyl alcohol and 2-hydroxylethyl phenyl ether and an aromatic aldehyde selected from the group consisting of benzaldehyde, o-tolylaldehyde, m-tolylaldehyde and p-tolylaldehyde wherein the ratio of the aromatic alcohol to the aromatic aldehyde is greater than 1.0;

b. treating said aromatic polamide shaped article which has been treated with said dye carrier composition, in a dye bath solution having a pH of about 2 to 7 consisting essentially of water and a cationic dye;

c. heating said dye bath solution containing said aromatic polyamide shaped article gradually to about 210° to 270°F.;

d. maintaining said dye bath solution at a temperature of about 210° to 270°F. for about 1-3 hours to produce a dyed aromatic polyamide shaped article;

e. cooling said dye bath solution;

f. rinsing said dyed aromatic polyamide shaped article with warm water; and g. drying said dyed aromatic polyamide shaped article at about 100° to 400°F.

9. The process of claim 8 further comprising adding about 5 to 40 percent (based on the weight of said dye carrier composition) of an auxiliary dye carrier selected from the group consisting of benzoic acid, p-phenylphenol and benzene sulfonamide.

* * * * *

PO-1050
(5/69)

UNITED STATES PATENT OFFICE
CERTIFICATE OF CORRECTION

Patent No. 3,836,327    Dated September 17, 1974

Inventor(s) Friedrich F. Bartsch

It is certified that error appears in the above-identified patent and that said Letters Patent are hereby corrected as shown below:

Column 3, line 28 "alcohol" should be -- aldehyde --.

Column 4, line 6, correct the spelling of "such".

Signed and sealed this 17th day of December 1974.

(SEAL)
Attest:

McCOY M. GIBSON JR.
Attesting Officer

C. MARSHALL DANN
Commissioner of Patents